United States Patent
Sim (10) Patent No.: US 9,771,965 B2
(45) Date of Patent: Sep. 26, 2017

(54) EARTH BOLT CONTAINING SURFACE TREATMENT LAYER AND METHOD OF SURFACE TREATMENT OF EARTH BOLT

(71) Applicants: Hyundai Motor Company, Seoul (KR); Kia Motors Corporation, Seoul (KR)

(72) Inventor: Gyu Man Sim, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 355 days.

(21) Appl. No.: 14/482,540

(22) Filed: Sep. 10, 2014

(65) Prior Publication Data

US 2015/0176628 A1 Jun. 25, 2015

(30) Foreign Application Priority Data

Dec. 19, 2013 (KR) .................. 10-2013-0159094

(51) Int. Cl.
| | |
|---|---|
| F16B 43/00 | (2006.01) |
| F16B 35/00 | (2006.01) |
| C25D 5/48 | (2006.01) |
| C23C 28/00 | (2006.01) |
| F16B 33/06 | (2006.01) |
| C25D 7/00 | (2006.01) |

(Continued)

(52) U.S. Cl.
CPC ............ *F16B 35/00* (2013.01); *C23C 28/321* (2013.01); *C23C 28/345* (2013.01); *C23C 28/3455* (2013.01); *C25D 3/60* (2013.01); *C25D 5/48* (2013.01); *C25D 7/003* (2013.01); *C25D 11/38* (2013.01); *F16B 33/06* (2013.01); *Y10T 428/12549* (2015.01)

(58) Field of Classification Search
CPC ........ C23C 28/34; C23C 28/321; C23C 28/30
USPC .......................................... 411/378; 428/623
See application file for complete search history.

(56) References Cited

U.S. PATENT DOCUMENTS

| | | | | |
|---|---|---|---|---|
| 4,411,964 A | * | 10/1983 | Hara ..................... | C09D 5/08 |
| | | | | 428/623 |
| 5,387,473 A | * | 2/1995 | Yoshimi .................. | B05D 7/14 |
| | | | | 428/623 |

(Continued)

FOREIGN PATENT DOCUMENTS

| | | |
|---|---|---|
| JP | 07-041962 | 2/1995 |
| KR | 10-1987-0009053 A | 10/1987 |

(Continued)

OTHER PUBLICATIONS

Skar, et al., "Emerging Trends in Corrosion Protection of Magnesium Die-Castings", Magnesium Technology 2002.

*Primary Examiner* — Gary Estremsky
(74) *Attorney, Agent, or Firm* — Mintz Levin Cohn Ferris Glovsky and Popeo, P.C.; Peter F. Corless (57) ABSTRACT

An earth bolt with a surface treatment layer are a method of surface treatment of the earth bolt are provided. The surface treatment includes a tin-zinc plated layer, a colored chromate film layer and a silicate coating layer. Since the earth bolt with the surface treatment layer has improved electro-conductivity and anti-rusting property, it may protect electrical/electronic components fitted to a vehicle from electromagnetic shock and remove noise therefrom, thereby improving reliability of a vehicle body.

9 Claims, 6 Drawing Sheets (51) Int. Cl.
*C25D 3/60* (2006.01)
*C25D 11/38* (2006.01)

(56) References Cited

U.S. PATENT DOCUMENTS

| | | | | |
|---|---|---|---|---|
| 5,482,787 | A * | 1/1996 | Sujita | B05D 7/14 |
| | | | | 428/623 |
| 5,496,652 | A * | 3/1996 | Sasaki | B05D 7/51 |
| | | | | 428/623 |
| 5,514,483 | A * | 5/1996 | Sujita | B05D 7/51 |
| | | | | 428/623 |
| 5,827,618 | A * | 10/1998 | Oyagi | C23C 2/02 |
| | | | | 148/530 |
| 6,565,671 | B1 * | 5/2003 | Lee | C23C 22/38 |
| | | | | 106/14.12 |
| 6,866,944 | B2 * | 3/2005 | Nakazawa | C23C 28/00 |
| | | | | 206/524.3 |
| 7,314,671 | B1 * | 1/2008 | Preikschat | C23C 22/34 |
| | | | | 428/472.1 |
| 7,981,463 | B2 * | 7/2011 | Goto | B32B 15/013 |
| | | | | 427/435 |

FOREIGN PATENT DOCUMENTS

| | | |
|---|---|---|
| KR | 10-1996-0002120 | 2/1996 |
| KR | 10-2007-0068595 | 7/2007 |
| KR | 10-0742920 | 7/2007 |
| KR | 10-0765068 | 10/2007 |
| KR | 10-2011-0007217 | 1/2011 |
| KR | 10-2013-0057481 | 5/2013 |
| WO | 2004/046425 | 6/2004 |

* cited by examiner

FIG.1

RELATED ART

FIG.2

RELATED ART

EARTH BOLT CONTAINING SURFACE TREATMENT LAYER AND METHOD OF SURFACE TREATMENT OF EARTH BOLT

CROSS-REFERENCE TO RELATED APPLICATION

This application claims under 35 U.S.C. §119(a) the benefit of Korean Patent Application No. 10-2013-0159094 filed on Dec. 19, 2013, the entire contents of which are incorporated herein by reference.

TECHNICAL FIELD

The present invention relates to an earth bolt that includes a surface treatment layer which may include a tin-zinc plated layer; a colored chromate film layer; and a silicate coating layer, and a surface treatment method thereof. In particular, the present invention provides a surface treatment layer of the earth bolt having improved electro-conductivity and anti-rusting property. Therefore, electrical or electronic components fitted to a vehicle may be protected from electromagnetic shock and noise therefrom may be removed, thereby improving reliability of a vehicle body.

BACKGROUND

Figure 1:
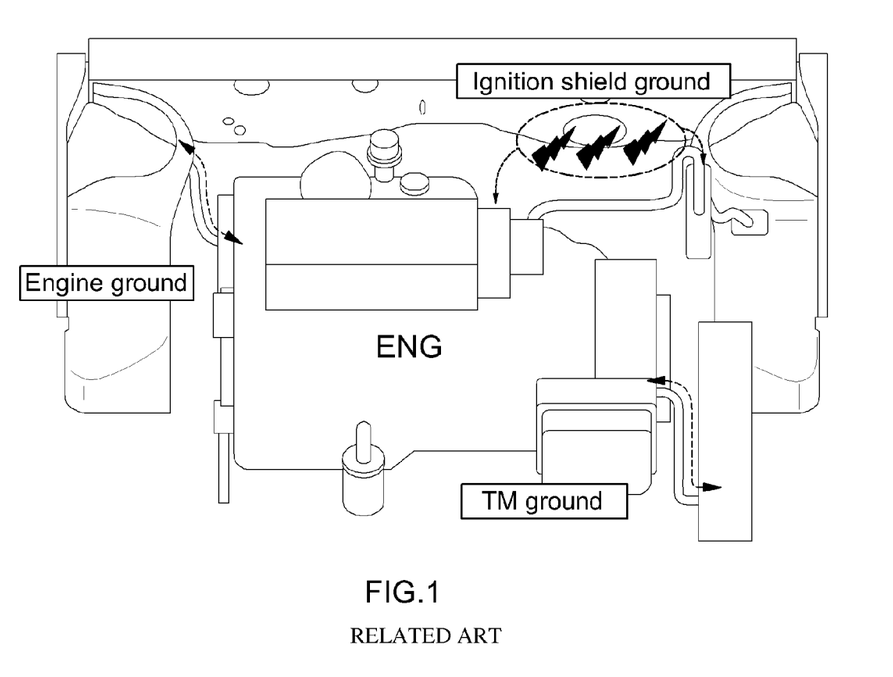
FIG. 1 is an exemplary schematic view of an engine of a vehicle where an earth bolt may be installed according to the related art.
Figure 2:
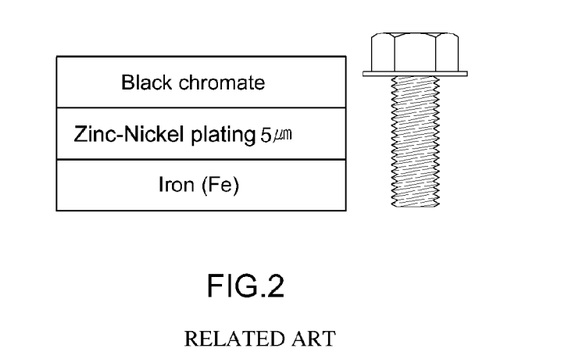
FIG. 2 shows an exemplary schematic view of a surface treatment layer for a conventional earth bolt according to the related art.

As shown in FIG. 1, earth bolts may protect electrical/electronic components of a vehicle from electromagnetic shock and also suppress noise therefrom. In fact, the earth bolts are safety-related parts of a vehicle, and thus, electro-conductivity and anti-rusting property of the earth bolts should be maintained. In conventional techniques, typical earth bolts may have a surface treatment layer to improve electro-conductivity and anti-rusting property, as shown in FIG. 2. For example, the conventional surface treatment layer may be formed by plating with zinc-nickel including high concentration of nickel of about 12 to 18 wt % and applying a black chromate film layer thereon.

Figure 3:
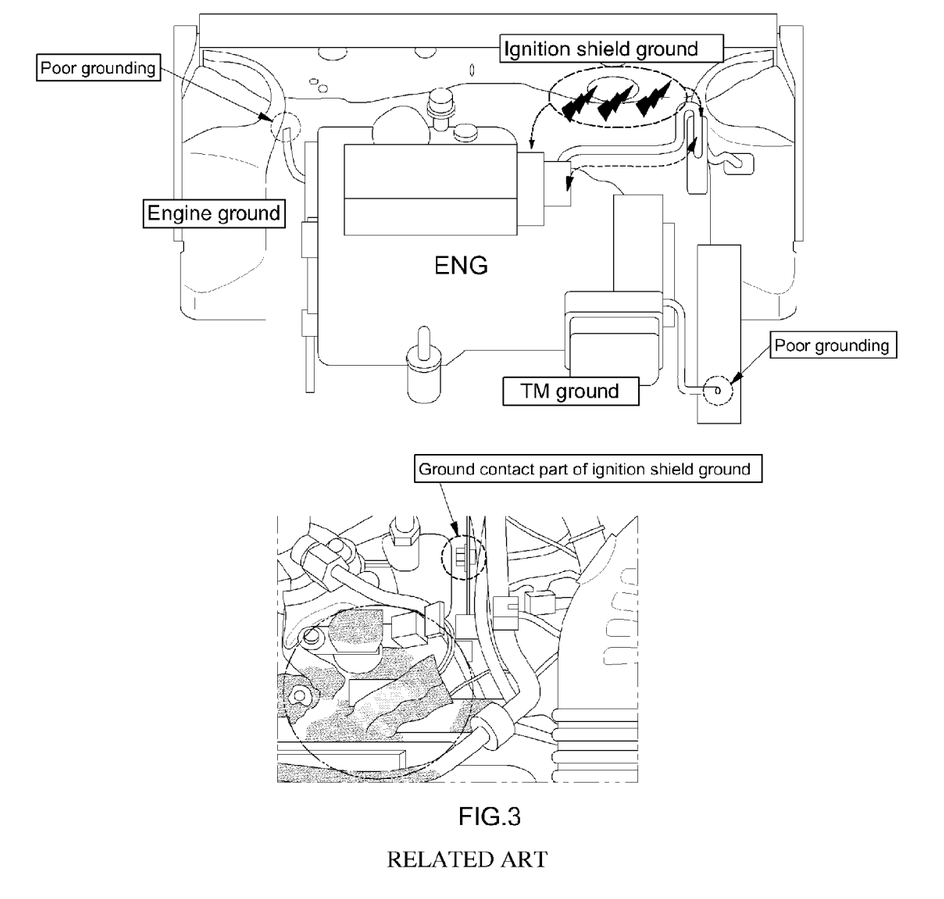
FIG. 3 shows an exemplary schematic view of an engine with poor grounding in an engine room according to the related art.

Although such zinc-nickel plated layer has good corrosion resistance, its electro-conductivity may be inferior. Thus, when a problem, for example, poor removal of vehicle body electroplating, noncompliance of fastening torque and deprived formation of earth bolts, occurs, an engine may be damaged due to poor grounding of the zinc-nickel plated layer as illustrated in FIG. 3.

Therefore, some efforts have been made to solve the technical difficulties described above. For example, a method for coating a zinc-plated steel sheet with a chromate film and a silicon-based coating solution has been reported. However, when the earth bolt was applied to a vehicle engine room, improvement of electro-conductivity was not sufficient. Thus, it has been desired to develop a surface treatment method of an earth bolt and an earth bolt manufactured therefrom, to thereby improve reliability of a vehicle body by protecting the electrical/electronic components in the vehicle from electromagnetic shock, removing noise, and providing significantly enhancing corrosion resistance and electro-conductivity.

The above information disclosed in this Background section is merely for enhancement of understanding of the background of the invention and therefore it may contain information that does not form the prior art that is already known in this country to a person of ordinary skill in the art.

SUMMARY OF THE INVENTION

The present invention provides a surface treatment method of an earth bolt having improved electro-conductivity and anti-rusting property. In particular, the present invention provides a tin-zinc plated layer, a colored chromate film layer and a silicate coating layer which may be formed on the surface of an earth bolt made of iron. Thus, the manufactured earth bolt may have improved electro-conductivity compared to the conventional earth bolt only having a zinc-nickel plated layer and a chromate film layer, thereby leading to improvement in anti-rusting property and corrosion resistance.

In one aspect, the present invention provides an earth bolt with a surface treatment layer including a plated layer, which may include a tin-zinc plated layer, a colored chromate film layer and a silicate coating layer. In an exemplary embodiment, the surface treatment layer may have a sequentially laminated structure of a tin-zinc plated layer, a colored chromate film layer and a silicate coating layer from the surface of the earth bolt. In another exemplary embodiment, the tin-zinc plated layer may be formed by plating with a plating solution containing tin of about 70 wt % or more based on the total weight of the tin-zinc plating solution. In still another exemplary embodiment, the tin-zinc plated layer may have a thickness of about 8 to 12 μm.

Furthermore, in yet another exemplary embodiment, the colored chromate film layer may have a thickness of about 1 μm or less. In still yet another exemplary embodiment, the silicate coating layer may have a thickness of about 1 μm or less. In another aspect, the present invention provides a method for the surface treatment of an earth bolt, which may include:

(i) plating an earth bolt with a plating solution containing tin of about 70 wt % or more based on the total weight of the tin-zinc plating solution, to thereby form a tin-zinc plated layer;

(ii) forming a film on the tin-zinc plated layer using a solution including chromic acid or dichromate, to form a colored chromate film layer; and (iii) applying a silicate solution on the colored chromate film layer, to thereby form a silicate coating layer.

In an exemplary embodiment, the tin-zinc plated layer may have a thickness of about 8 to 12 μm. In another exemplary embodiment, the colored chromate film layer may have a thickness of about 1 μm or less. In still another exemplary embodiment, the silicate coating layer may have a thickness of about 1 μm or less.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail.

Figure 4:
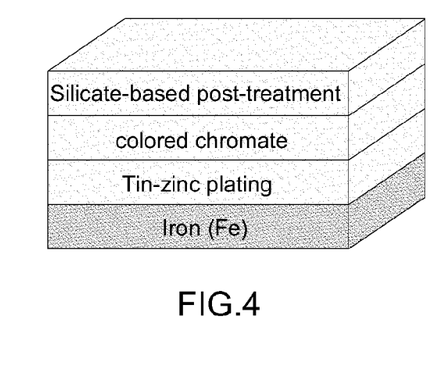
FIG. 4 shows an exemplary schematic view of a surface treatment layer of the earth bolt according to an exemplary embodiment of the present invention.

In one aspect, the present invention provides an earth bolt with a surface treatment layer including a plated layer, which may include a tin-zinc plated layer, a colored chromate film layer and a silicate coating layer. The surface treatment layer may have a sequentially laminated structure of the tin-zinc plated layer, colored chromate film layer and silicate coating layer on the surface of an earth bolt made of iron, as shown in FIG. 4.

In an exemplary embodiment, the tin-zinc plated layer may be formed by electro-plating with a plating solution containing tin of about 70 wt % or more based on the total weight of the tin-zinc plating solution, but there may not be limited to the plating method. The tin-zinc plated layer may impart electro-conductivity, and may have a thickness of about 8 to 12 μm. When the thickness of the plated layer is less than about 8 μm, corrosion resistance may not be achieved. When the thickness of the plated layer is greater than about 12 μm, productivity may decrease, production cost may increase due to an excessive thickness of the plated layer, and adhesive property may be poor. In other exemplary embodiment, the colored chromate film layer may provide the tin-zinc plated layer with anti-rusting property. In addition, the colored chromate film may have a thickness of about 1 μm or less. Additionally, the silicate coating layer may maintain electro-conductivity and improve anti-rusting property. The silicate coating layer may have a thickness of about 1 μm or less. In addition, silicate generated by combining silica ($SiO_2$) with one or more of metal oxides may be used, without any limitation. Particularly, in contrast to the conventional surface treatment of an earth bolt which does not include any post-treatment by silicate, the present invention may apply a post-treatment with silicate to further improve electro-conductivity. In particular, the silicate compound may include about 5 to 10 wt % of silica, at a concentration of about 30 to 40%, based on water content by considering increasing production costs over obtained effects.

Figure 5:
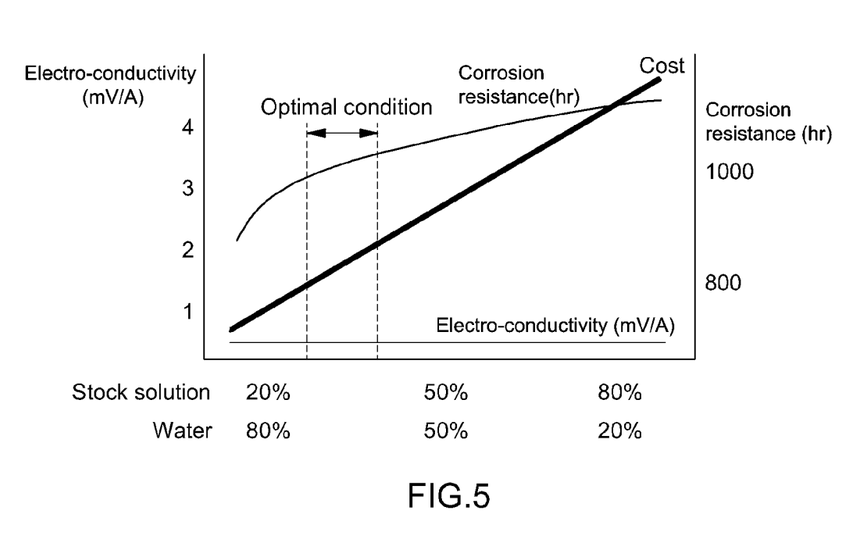
FIG. 5 shows an exemplary graph of electro-conductivity, corrosion resistance, and production cost according to a concentration of a diluted silicate solution for the post-treatment to form a silicate coating layer according to an exemplary embodiment of the present invention.

FIG. 5 shows an exemplary graph including the electro-conductivity, corrosion resistance, and production costs according to various concentration of the diluted silicate solution for the post-treatment to form a silicate coating layer. In FIG. 5, the electro-conductivity may be slightly changed from about 0.1 to 0.16 mV/A regardless of the change in the concentration of the silicate compound. In contrast, the corrosion resistance may gradually increase, because the higher the concentration of the silicate compound may improve the corrosion resistance more. However, considering the increasing production costs, the optimized concentration range of the silicate solution according to an exemplary embodiment may be in a range from about 30 to about 40% based on water content.

In another aspect, the present invention provides a method for the surface treatment of an earth bolt, which may include: (i) plating an earth bolt with a plating solution containing tin of about 70 wt % or greater based on the total weight of the tin-zinc plating solution, to form a tin-zinc plated layer; (ii) forming a film on the tin-zinc plated layer using a solution including chromic acid or dichromate, to form a colored chromate film layer; and (iii) applying a silicate solution on the colored chromate film layer, to form a silicate coating layer.

In an exemplary embodiment, the step (i) may be forming a tin-zinc plated layer by plating an earth bolt with a tin-zinc plating solution containing tin of about 70 wt % or greater based on the total weight of the tin-zinc plating solution. The formation of the tin-zinc plated layer may have an advantage, i.e. good electro-conductivity over the conventional zinc-nickel plated layer. In addition, plating may be carried out by treating the earth bolt at a current density of about 0.5 to 0.6 A/dm$^2$ and at about 25° C. for about 80 min, to form the tin-zinc plated layer having a thickness of about 8 to 12 μm. In certain exemplary embodiments, the plating condition may be varied based on the procedure condition. When the thickness of the tin-zinc plated layer is less than about 8 μm, corrosion resistance may not be achieved. When the thickness of the tin-zinc plated layer is greater than about 12 μm, productivity may decrease, production cost may increase due to an excessive thickness of the tin-zinc plated layer, and adhesive property may be poor.

In other exemplary embodiments, the step (ii) may include forming a colored chromate film layer on the tin-zinc plated layer through the formation of a film layer using a solution containing chromic acid or dichromate as a main component. The formation of the colored chromate film layer may improve anti-rusting property of the tin-zinc plated layer. In addition, treating the earth bolt of step (ii) may be conducted at about 40° C. for about 1 min, to form the colored chromate film layer. Further, the colored chromate film layer may have a thickness of about 1 μm or less. In particular, the condition for forming the colored chromate film layer may be varied based on the procedure condition.

In another exemplary embodiment, the step (iii) may include forming a silicate coating layer by applying a silicate solution on the colored chromate film layer. In particular, the colored chromate film layer may be treated with the silicate solution at about 25° C. for about 30 sec, to form the silicate coating layer. In addition, the silicate coating layer may have a thickness of about 1 μm or less. Particularly, the condition for forming the silicate coating layer may be varied based on the procedure condition.

In yet another exemplary embodiment of the present invention, the manufactured surface treatment layer may have a sequentially laminated structure of the tin-zinc plated layer, the colored chromate film layer and the silicate coating layer from the surface of the earth bolt made of iron. Therefore, the present invention may provide an earth bolt which may protect electrical/electronic components of the vehicles from electromagnetic shock and suppress noise, due to improved corrosion resistance, anti-rusting property and electro-conductivity of the surface treatment layer, in contrast to the conventional earth bolts having a zinc-plated layer and a black chromate layer.

The following examples illustrate the invention and are not intended to limit the same.

Example 1

An earth bolt was treated with a tin-zinc plating solution including tin of about 70 wt % or more based on the total weight of the tin-zinc plating solution under the condition of a current density of about 0.5 to 0.6 A/dm$^2$ and at a temperature of about 25° C. for about 80 min, to thereby form a tin-zinc plated layer having a thickness of about 8 μm. Subsequently, the earth bolt was treated with a solution including chromic acid or dichromate as a main component at about 40° C. for about 1 min, to form a colored chromate film layer having a thickness of about 1 μm or less. Thereafter, the colored chromate film layer of the earth bolt was treated with a silicate solution at about 25° C. for about 30 sec, to form a silicate coating layer having a thickness of about 1 μm or less. As a result, the earth bolt including a surface treatment layer of the tin-zinc plated layer, the colored chromate film layer and the silicate coating layer was manufactured.

Comparative Example 1

An earth bolt was treated with a zinc-nickel plating solution under the condition of a current density of about 0.5 to 0.6 A/dm$^2$ and at a temperature of about 25° C. for about 80 min, to form a zinc-nickel plated layer having a thickness of about 8 μm, subsequently followed by treating with black chromate. As results, an earth bolt including the zinc-nickel plated layer and the black chromate layer was manufactured.

Comparative Example 2

An earth bolt was treated with a tin-zinc plating solution including tin of about 70 wt % or greater based on the total weight of the tin-zinc plating solution under the condition of a current density of about 0.5 to 0.6 A/dm$^2$ and a temperature of about 25° C. for about 80 min, to form a tin-zinc plated layer having a thickness of about 8 μm. The earth bolt was then treated with a solution including chromic acid or dichromate as a main component at about 40° C. for about 1 min, to form a colored chromate film layer having a thickness of about 1 μm or less. As a result, the earth bolt including a surface treatment layer of the tin-zinc plated layer and the colored chromate film layer was manufactured.

The earth bolts on which the surface treatment layer was formed according to Example 1 and Comparative Examples 1-2 were subjected to the measurement of electro-conductivity and anti-rusting property according to the following methods.

Test Example 1: Electro-Conductivity Test

Figure 6:
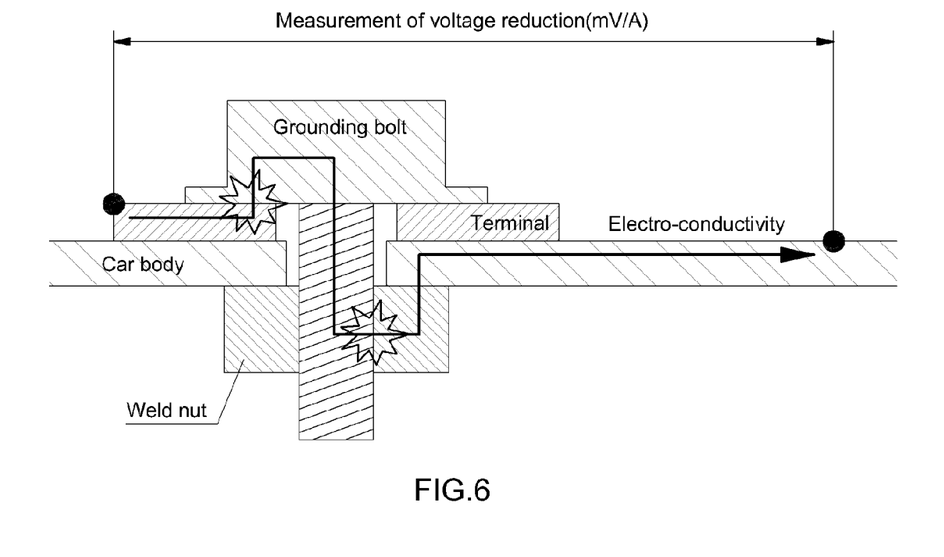
FIG. 6 is an exemplary diagram showing voltage reduction during an electro-conductivity test of Test Example 1 according to an exemplary embodiment of the present invention.

As shown in FIG. 6, the electro-conductivity test was performed by electrodepositing a steel sheet (e.g., back weld nuts), fastening the steel sheet by inserting the earth bolt to be measured along with a terminal, applying about 1 V to the terminal using a substantially constant current circuit, and measuring a resistance value generated therefrom. The test was repeated about 8 times. The results are shown in Table 1 and also represented by a graph in FIG. 7.

TABLE 1

| | #1 | #2 | #3 | #4 | #5 | #6 | #7 | #8 | Minimum | Maximum | Average |
|---|---|---|---|---|---|---|---|---|---|---|---|
| Comparative Example 1 | 0.80 | 2.79 | 2.52 | 0.83 | 2.98 | 0.64 | 0.64 | 1.07 | 0.64 | 2.98 | 1.53 |
| Example 1 | 0.10 | 0.16 | 0.10 | 0.15 | 0.12 | 0.16 | 0.10 | 0.16 | 0.10 | 0.16 | 0.13 |

Figure 7:
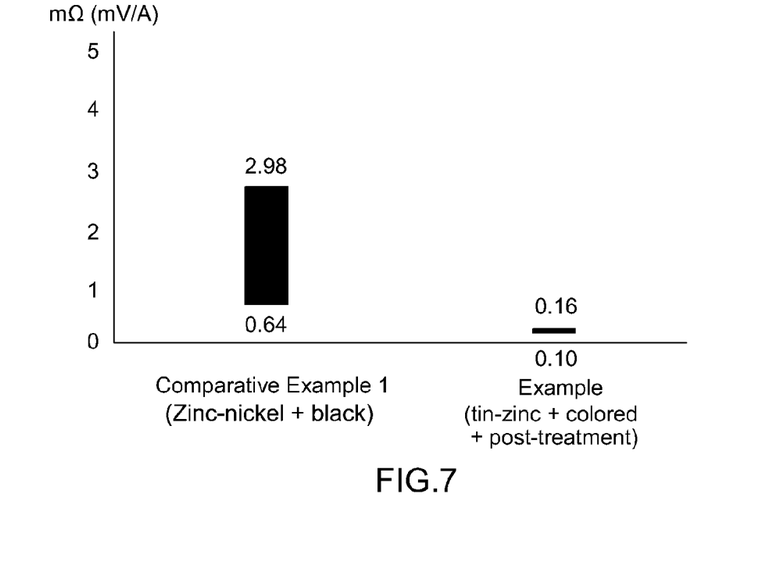
FIG. 7 shows exemplary results of an electro-conductivity test of Comparative Example 1 and Example 1 according to Test Example 1 of the exemplary embodiment of the present application.

In Table 1 and FIG. 7, while the average resistance of Comparative Example 1 was about 1.53 mΩ (mV/A), the average resistance of Example 1 was about 0.13 mΩ (mV/A). Therefore, the electro-conductivity of the earth bolt according to the present invention may be significantly improved by about 12-fold or greater.

Test Example 2: Anti-Rusting Property Test
(One-Piece Test)

(1) Salt spray test (SST): Corrosion resistances of Example 1 and Comparative Example 2 were measured according a standard method KS D9502 (ISO 9227, ASTM B117, JIS Z2371), and the results are shown in FIG. 8.

Figure 8:
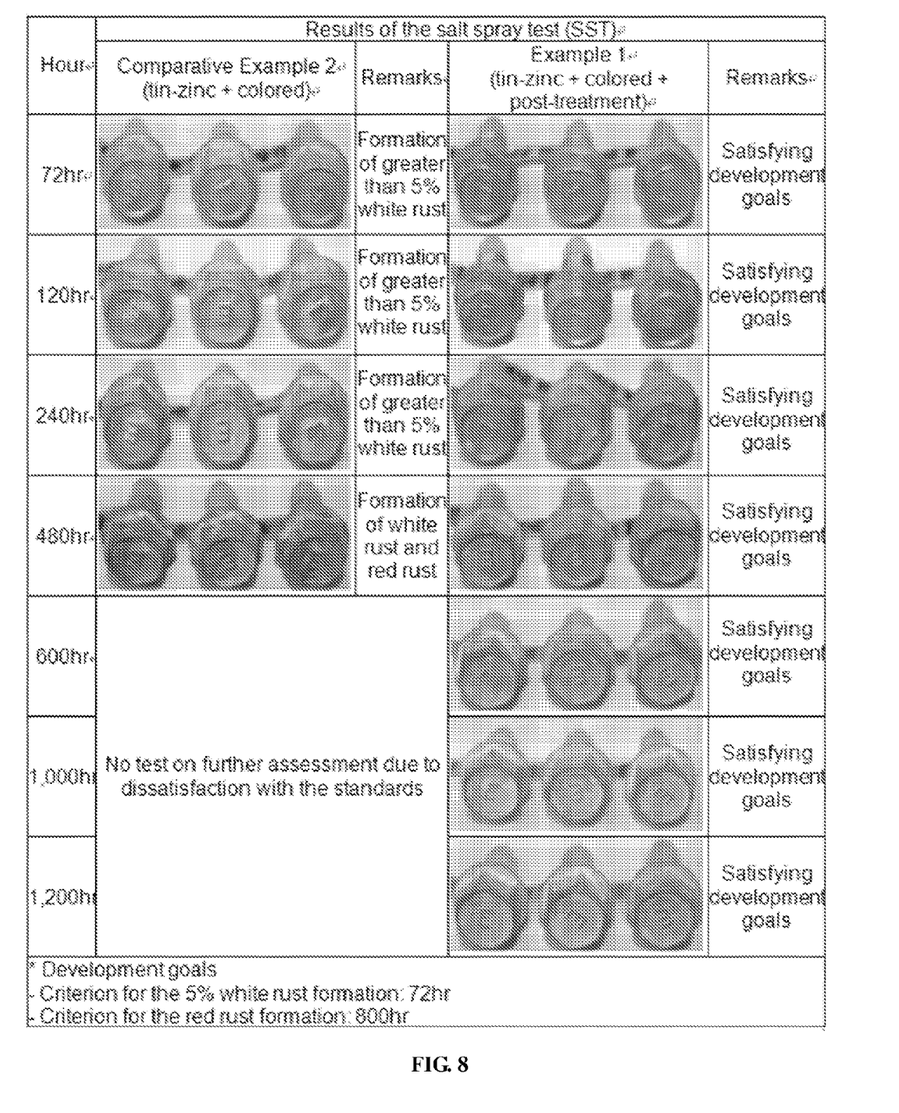
FIG. 8 shows exemplary photographic images of the earth bolts after a salt spray test of Comparative Example 2 and Example 1 according to Test Example 2 of the exemplary embodiment of the present application.

From the results as shown in FIG. 8, when the earth bold of Example 1 according to an exemplary embodiment of the present invention may be coated with a silicate compound, the criteria for forming 5% white rust, which is about 72 hr, were satisfied. In addition, other criteria for forming red rust, which is about 800 hr, were also satisfied for Example 1.

(2) Cyclic corrosion test (CCT): Corrosion resistances of Example 1 and Comparative Example 2 were measured after conducting 10 cycles, 20, cycles, 40 cycles, 50 cycles, and 80 cycles of salt spray, high temperature drying, moisturizing and low temperature drying, and the results are shown in FIG. 9.

Figure 9:
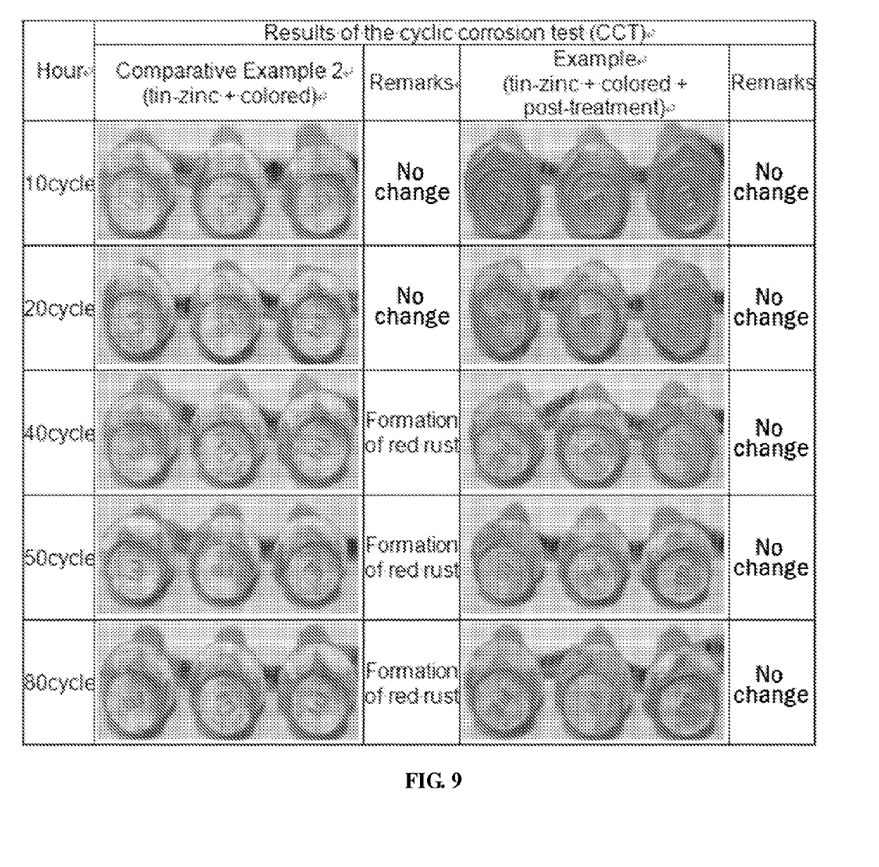
FIG. 9 shows exemplary photographic images of the earth bolts after a cyclic corrosion test of Comparative Example 2 and Example 1 according Test Example 2 of the exemplary embodiment of the present application.

From the results in Table 1, FIGS. 8 and 9, the earth bolt including the surface treatment layer formed by the surface treatment method of the present invention may have about 12-fold greater electro-conductivity than the conventional earth bolts including a zinc-nickel plated layer. In addition, the earth bolt of the present invention may have the same or substantially similar corrosion resistance to the conventional earth bolts manufactured by a conventional surface treatment method. Thus, the earth bolt of the present invention may have improved anti-rusting property and corrosion resistance.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An earth bolt with a surface treatment layer including a plated layer, comprising:
   a tin-zinc plated layer;
   a colored chromate film layer; and
   a silicate coating layer,
   wherein the tin-zinc plated layer is formed by plating with a plating solution containing tin of about 70 wt % or greater based on the total weight of the tin-zinc plating solution.

2. The earth bolt with the surface treatment layer according to claim 1, wherein the surface treatment layer has a sequentially laminated structure of a tin-zinc plated layer, a colored chromate film layer and a silicate coating layer from the surface of the earth bolt.

3. The earth bolt with the surface treatment layer according to claim 1, wherein the tin-zinc plated layer has a thickness of about 8 to 12 μm.

4. The earth bolt with the surface treatment layer according to claim 1, wherein the colored chromate film layer has a thickness of about 1 μm or less.

5. The earth bolt with the surface treatment layer according to claim 1, wherein the silicate coating layer has a thickness of about 1 μm or less.

6. A method for the surface treatment of an earth bolt, comprising:
   plating an earth bolt with a plating solution containing tin of about 70 wt % or greater based on the total weight of the tin-zinc plating solution, to form a tin-zinc plated layer;
   forming a film on the tin-zinc plated layer using a solution including chromic acid or dichromate, to form a colored chromate film layer; and
   applying a silicate solution on the colored chromate film layer, to form a silicate coating layer.

7. The method for the surface treatment according to claim 6, wherein the tin-zinc plated layer has a thickness of about 8 to 12 μm.

8. The method for the surface treatment according to claim 6, wherein the colored chromate film layer has a thickness of about 1 μm or less.

9. The method for the surface treatment according to claim 6, wherein the silicate coating layer has a thickness of about 1 μm or less.

* * * * *